(12) United States Patent
Hsu et al.

(10) Patent No.: US 7,965,746 B2
(45) Date of Patent: Jun. 21, 2011

(54) METHOD FOR CONTROLLING POWER OF AN OPTICAL DISK DRIVE

(75) Inventors: Chia-Hsing Hsu, Taoyuan (TW); Yi-Long Hsiao, Taoyuan (TW)

(73) Assignee: Quanta Storage Inc., Taoyuan County (TW)

( * ) Notice: Subject to any disclaimer, the term of this patent is extended or adjusted under 35 U.S.C. 154(b) by 326 days.

(21) Appl. No.: 12/289,124

(22) Filed: Oct. 21, 2008

(65) Prior Publication Data

US 2009/0135865 A1    May 28, 2009

(30) Foreign Application Priority Data

Nov. 23, 2007  (TW) ................................ 96144695 A

(51) Int. Cl.
*H01S 3/13*    (2006.01)
*H01S 3/00*    (2006.01)

(52) U.S. Cl. ............ 372/29.014; 372/29.021; 372/38.07
(58) Field of Classification Search ............. 372/29.014, 372/29.015, 29.021, 38.07
See application file for complete search history.

*Primary Examiner* — Armando Rodriguez
(74) *Attorney, Agent, or Firm* — Bacon & Thomas, PLLC

(57) ABSTRACT

A method for controlling laser power of an optical disk drive is provided. Firstly, a power-controlling curve of a first loop circuit is formed according to a real test. Next, two test points are selected from the power-controlling curve. Then, the voltage outputted from a second loop circuit is adjusted. After that, whether the generated internal power signal is equal to the internal power signal of the two test points is checked. Afterwards, the voltage outputted from the second loop circuit is recorded. Then, the gain of the two loop circuits under the same change of the internal power signal is calculated. Lastly, a gained power-controlling curve of the first loop circuit is used as a power-controlling curve of the second loop circuit, such that the power-controlling curve is quickly obtained.

7 Claims, 4 Drawing Sheets

METHOD FOR CONTROLLING POWER OF AN OPTICAL DISK DRIVE

This application claims the benefit of Taiwan application Serial No. 96144695, filed Nov. 23, 2007, the subject matter of which is incorporated herein by reference.

BACKGROUND OF THE INVENTION

1. Field of the Invention

The invention relates in general to an optical disc drive, and more particularly to a method for controlling laser power of an optical disc drive which uses a circuit laser power curve of one loop circuit to obtain a circuit laser power curve of the other loop circuit.

2. Description of the Related Art

In order to speed up reading/writing data of an optical disc, the optical disc drive, after the optical disc is positioned, would normally use a laser beam of suitable power to recognize disc specification and test laser power under an open-loop circuit or closed-loop circuit control system so as to set up best parameters for the required signal processing and servo system to correctly read/write data of the optical disc.

As indicated in FIG. 1, a power-controlling curve of a conventional optical disc drive is shown. The open-loop circuit and the closed-loop control circuit of the conventional optical disc drive are different circuits and have different levels of signal reference. In order to correctly control the laser power, in the area of the optical disc, the laser powers (such as the powers P1~P5) outputted from the laser diode are tested by different input voltages (such as voltages V1~V5) or input currents in a real test. Then, a laser power curve of open-loop circuit or closed-loop circuit is obtained by linear fitting these test points according to a mathematical algorithm. Then, the laser power curve is used as parameters by which the open-loop circuit and the closed-loop circuit of the optical disc drive control the laser diode and output a light beam with correct laser power.

In order to obtain a laser power curve to control the output of laser power, many test points selected from the open-loop circuit and closed-loop control circuit of the optical disc drive need to be tested and the complicated linear-fitting algorithm needs to be calculated, not only wasting time but also deteriorating the efficiency of the optical disc drive. Thus, the conventional optical disc drive still has many problems to resolve in the control of laser power.

SUMMARY OF THE INVENTION

The invention is directed to a method for controlling laser power of an optical disk drive. The power-controlling curve of either an open-loop circuit and or a closed-loop circuit is formed in a real test. Then, the power-controlling curve of the other loop circuit is formed by use of gain adjustment. Thus, the required time for real test is reduced and the power-controlling curve is quickly obtained.

According to a first aspect of the present invention, a method for controlling laser power of an optical disk drive is provided. By use of an internal power signal with faster response, an outputted voltage is adjusted as a predetermined internal power signal, the gain between the two loop circuits due to voltage change is calculated, and the power-controlling curve of the other loop circuit is correctly obtained.

To achieve the above objects of the invention, a method for controlling laser power of an optical disk drive is provided. The method for controlling the laser power of an optical disk drive of the invention includes the following steps. Firstly, an outputted voltage is tested in a real test to obtain an internal power signal and form a power-controlling curve of a first loop circuit. Next, two test points are selected from the power-controlling curve of the first loop circuit. Then, the voltage outputted from the second loop circuit is adjusted. After that, whether the internal power signal generated by the outputted voltage matches with the internal power signal of the two test points is checked. If no match is found, the method continues to adjust the voltage outputted from the second loop circuit, but if a match is found, the method proceeds to the next step. Afterwards, the voltage outputted from the second loop circuit is recorded. Then, the gain of the two loop circuits under the same change of the internal power signal is calculated. Lastly, the gained power-controlling curve of the first loop circuit is used as a power-controlling curve of the second loop circuit.

The invention will become apparent from the following detailed description of the preferred but non-limiting embodiments. The following description is made with reference to the accompanying drawings.

DETAILED DESCRIPTION OF THE INVENTION

The technologies and methods used to achieve the above objects of the invention are exemplified in the following preferred embodiments with accompanying drawings.

Figure 1:
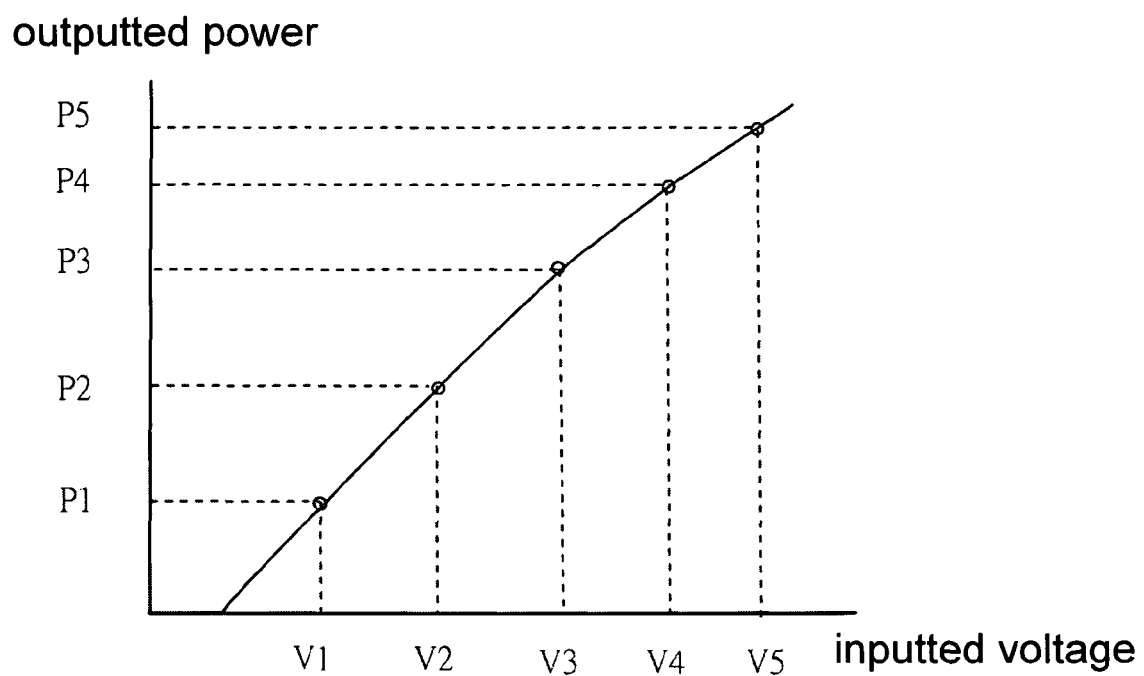
FIG. 1 (Prior Art) shows a power-controlling curve of a conventional optical disc drive.
Figure 2:
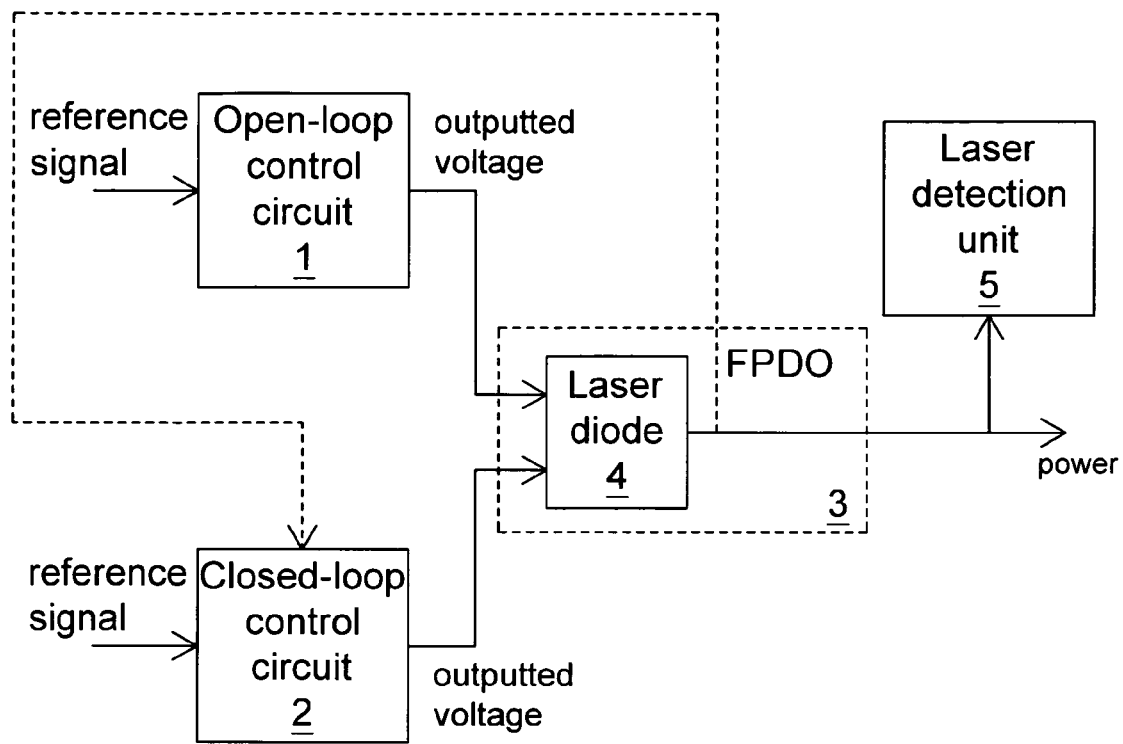
FIG. 2 shows a functional block diagram of a power control system of an optical disc drive according to a preferred embodiment of the invention.

Referring to FIG. 2, a functional block diagram of a power control system of an optical disc drive according to a preferred embodiment of the invention is shown. A reference signal can be respectively inputted to an open-loop control circuit 1 and a closed-loop control circuit 2 to generate a voltage (or a current). The generated voltage is outputted to a pick-up head 3 of the optical disc drive. After the voltage is received by a laser diode 4 of the pick-up head 3, an internal power signal, such as Front Photo Diode Output signal (abbreviated as FPDO signal), is generated according to the volume of the voltage. The FPDO signal is internally feed-backed to the open-loop control circuit 1 and the closed-loop control circuit 2 to output a laser power of corresponding volume. The actually outputted laser power can be detected with a power detection unit 5. The open-loop control circuit 1 and the closed-loop control circuit 2 of the power control system of the optical disc drive of the invention have different circuits and result in a shift in the reference level of respective outputted voltage. However, the open-loop control circuit 1 and the closed-loop control circuit 2 do not have any difference in the circuit after the voltage is outputted. The outputted voltage generates an output of laser power, and there is a proportional relationship between the two loop circuits.

Figure 3:
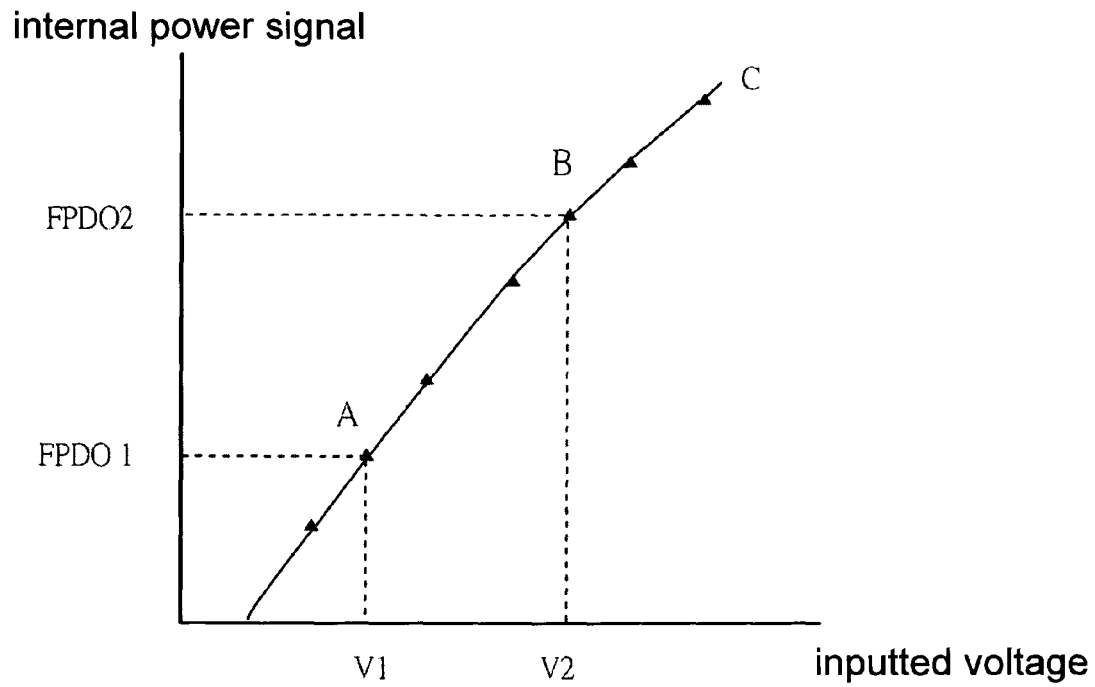
FIG. 3 shows a closed-loop circuit power-controlling curve according to the preferred embodiment of the invention.
Figure 4:
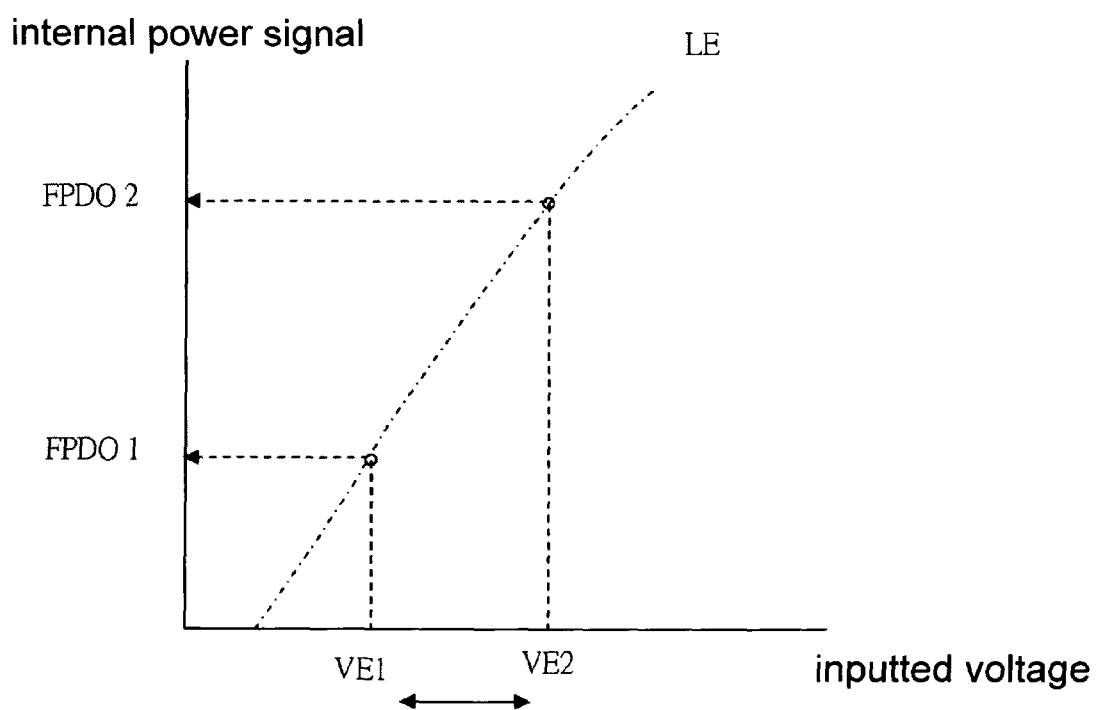
FIG. 4 shows an open-loop circuit power-controlling curve according to the preferred embodiment of the invention.

Referring to FIG. 2, FIG. 3 and FIG. 4 at the same time, FIG. 3 shows a closed-loop circuit power-controlling curve according to the preferred embodiment of the invention, and FIG. 4 shows an open-loop circuit power-controlling curve according to the preferred embodiment of the invention. The conventional optical disc drive needs to have real test on the open-loop circuit and closed-loop circuit to obtain respective power-controlling curve of the two loop circuits. To avoid the repetition of real test, the method for controlling the laser power of an optical disk drive of the invention, the power-controlling curve of one of the two loop circuits is obtained by real test and the power-controlling curve of the other loop circuit is obtained according to the proportional relationship between the two loop circuits. In the present embodiment of the invention, the power-controlling curve of the closed-loop circuit is obtained by real test, and the power-controlling curve of open-loop circuit is obtained from the power-controlling curve of the closed-loop circuit. As indicated in FIG. 3, the closed-loop control circuit 2 generates a number of different outputted voltages to the pick-up head 3 to excite the laser diode 4 to output a laser power. The actual output of laser power is detected by an external power detection unit 5, and generates a corresponding FPDO signal in the pick-up head 3. By measuring the output of laser power with the external power detection unit 5, the corresponding relationship between the FPDO signal and the actual output of laser power is obtained. The response time of the FPDO signal is much faster than that of the external power detection unit 5. Therefore, the FPDO signal displaces the output power, and the power-controlling curve C of the closed-loop circuit can be obtained by several test point (as denoted by the marks in FIG. 3) by way of linear fitting.

Test points A and B are selected from the test points of the power-controlling curve C of the closed-loop circuit. As the power-controlling curve C of the closed-loop circuit is closer to be linear in the low internal power signal area, the test point is preferably selected from the area closer to the low internal power signal. The test points A and B output the voltages V1 and V2 and correspondingly generate the internal power signals FPDO1 and FPDO2. As indicated in FIG. 4, in the open-loop control circuit 1, the outputted voltage is adjusted and transmitted to the pick-up head 3, and a relative FPDO signal is figured out from an unknown corresponding relationship curve LE to match with the known internal power signals FPDO1 and FPDO2 of the test points A and B. If the generated internal power signal of the open-loop control circuit 1 is equal to the known internal power signals FPDO1 and FPDO2 of the test points A and B, the corresponding outputted voltages VE1 and VE2 of the open-loop control circuit 1 are respectively recorded. Then, the gain G in the proportion between the two loop circuits is calculated according to the following formulas:

$$[(V2-V1)/(FPDO2-FPDO1)] \times G = [(VE2-VE1)/(FPDO2-FPDO1)]$$

Thus, after the power-controlling curve C of the closed-loop circuit is obtained in a real test, the voltage outputted from the open-loop control circuit 1 is multiplied by the gain G, and the actual output power is obtained from the power-controlling curve C of the closed-loop circuit. As the gained power-controlling curve C of the closed-loop circuit obtained by multiplying the power-controlling curve C of the closed-loop circuit by the gain G is used as the power-controlling curve of open-loop control circuit 1 without doing real test, the power-controlling curve of open-loop circuit and the closed-loop circuit can thus be quickly obtained.

Figure 5:
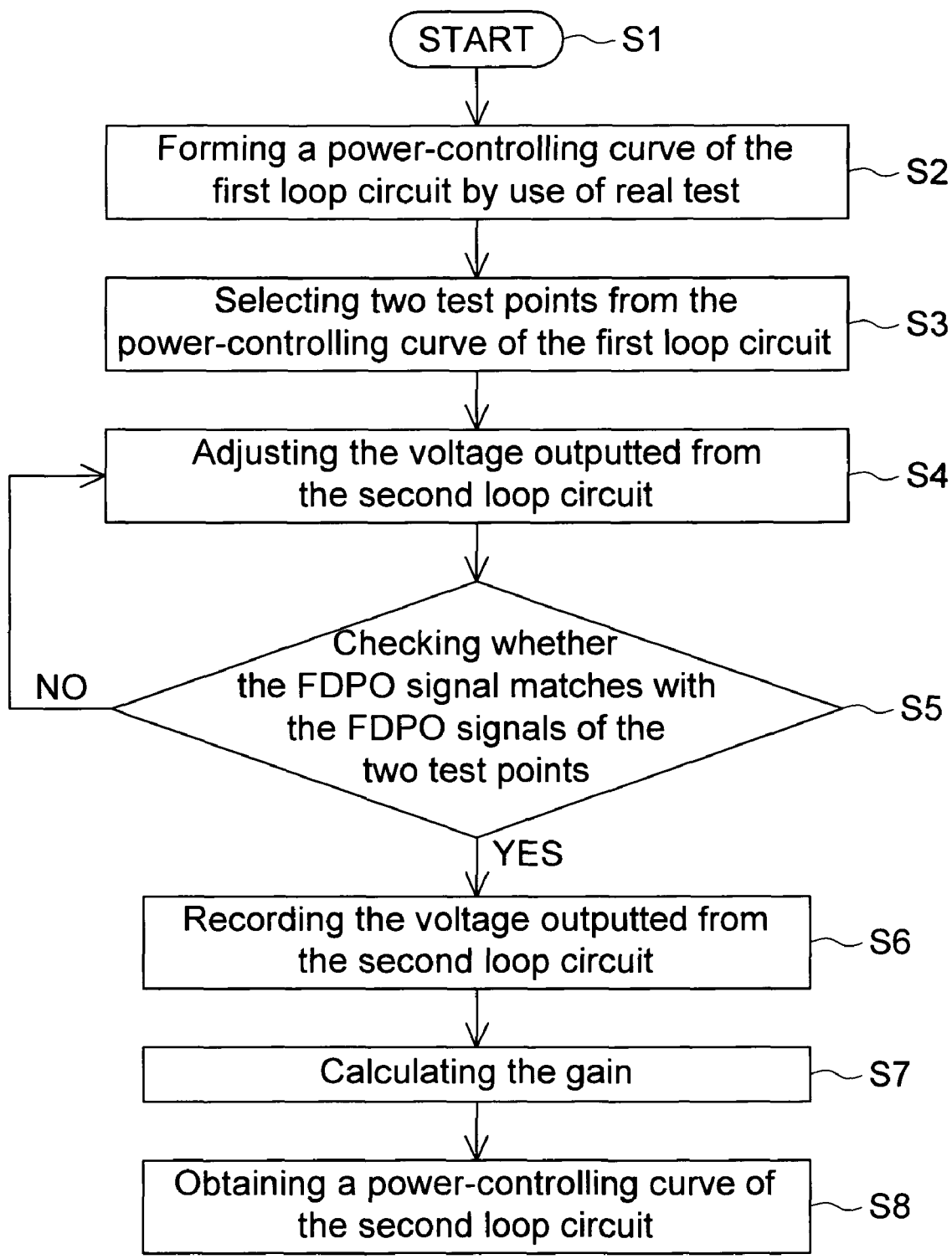
FIG. 5 shows a flowchart of a method for controlling laser power of an optical disk drive according to the preferred embodiment of the invention.

As indicated in FIG. 5, a flowchart of a method for controlling laser power of an optical disk drive according to the preferred embodiment of the invention is shown. In the invention, closed-loop control circuit is the first loop circuit, and the open-loop control circuit is the second loop circuit. The method of adjusting the power-controlling curve of the first loop circuit obtained by real test so as to quickly form the power-controlling curve of the second loop circuit are disclosed below. Firstly, the method begins at step S1. Next, the method proceeds to step S2, the outputted voltage is tested by the first loop control circuit in a real test to obtain a corresponding internal power signal and form a power-controlling curve of the first loop circuit. Then, the method proceeds to step S3, two test points are respectively selected from a high internal power signal and a low internal power signal of the power-controlling curve of the first loop circuit. After that, the method proceeds to step S4, the voltage outputted from the second loop control circuit is adjusted by aiming at achieving the internal power signal of the two selected test points. Afterwards, the method proceeds to step S5, whether the internal power signal generated by the voltage outputted from the second loop control circuit matches with the internal power signal of the two test points is checked. If the generated internal power signal does not match with the internal power signal of the two test points, the method returns to step S4 and continues to adjust the outputted voltage. If the generated internal power signal matches with the internal power signal of the two test points, the method proceeds to step S6, the voltage outputted from the second loop control circuit is recorded. Then, the method proceeds to step S7, the gain of the voltage change of the open-loop control circuit compared to the voltage change of the two real test points is calculated under the same change of the internal power signal. Lastly, the method proceeds to step S8, the gained power-controlling curve of the first loop circuit is used as the power-controlling curve of the second loop control circuit so as to obtain the power-controlling curve of the second loop control circuit.

According to the method for controlling the laser power of an optical disk drive of the invention, the power-controlling curve of one of the two loop circuits obtained in a real test is used to form the power-controlling curve of the other loop circuit. The voltage outputted from the other loop circuit is adjusted to achieve the same internal power signal. The change in the outputted voltage is obtained. The gain on the outputted voltage between two loop circuits is calculated. The voltage outputted from the other loop circuit, after suitable gain adjustment, obtains an output power from the power-controlling curve of the loop circuit obtained in real test, such that the power-controlling curve of the other loop circuit is formed from the gained power-controlling curve of the loop circuit obtained in real test. The method of the invention saves the required time for testing the power-controlling curve of the other loop circuit. Furthermore, the power-controlling curve of the other loop circuit can be quickly formed by use of original internal power signal (FPDO signal) and can do without the signal feedbacked via the external power detection unit.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for controlling laser power of an optical disk drive, wherein the method is used in an optical disc drive which comprises a first loop circuit and a second loop circuit, and the method comprises the steps of:

(1) testing an outputted voltage in a real test to obtain a power outputting signal and form a power-controlling curve of the first loop circuit;
(2) selecting two test points from the power-controlling curve of the first loop circuit;
(3) adjusting an voltage outputted from the second loop circuit by aiming at achieving a power outputting signal defined by the two selected test points;
(4) checking whether a power signal generated by the outputted voltage from the second loop circuit matches with the power outputting signal defined by the two test points, wherein if no match is found, the method returns to the step (3), and wherein if a match is found, the method proceeds to the step (5);
(5) recording the voltage outputted from the second loop circuit;
(6) calculating a gain of the first and second loop circuits under a same change of the power outputting signal checked in step 4; and
(7) using the gained power-controlling curve of the first loop circuit as a power-controlling curve of the second loop circuit.

2. The method for controlling the laser power of an optical disk drive according to claim 1, wherein the power outputting signal checked in step 4 is an internal power signal.

3. The method for controlling the laser power of an optical disk drive according to claim 2, wherein the two test points are selected from test points corresponding to a low internal power signal.

4. The method for controlling the laser power of an optical disk drive according to claim 1, wherein the step (6) comprises:

calculating the gain G according to the following formulas:

$$[(V2-V1)/(FPDO2-FPDO1)] \times G = [(VE2-VE1)/(FPDO2-FPDO1)]$$

wherein:
(V2−V1) denotes a change in the voltage outputted from the first loop circuit;
(FPDO2−FPDO1) denotes a change of (V2−V1) relative to the power outputting signal; and
(VE2−VE1) denotes a change in the voltage outputted from the second loop circuit under the same change of (FPDO2−FPDO1).

5. The method for controlling the laser power of an optical disk drive according to claim 4, wherein the step (7) comprises:

multiplying the voltage outputted from the second loop control circuit by the gain, and obtaining an actual output power from the power-controlling curve of the first loop circuit.

6. The method for controlling the laser power of an optical disk drive according to claim 1, wherein the first loop circuit is a closed-loop control circuit, and the second loop circuit is an open-loop control circuit.

7. The method for controlling the laser power of an optical disk drive according to claim 1, wherein the first loop circuit is an open-loop control circuit, and the second loop circuit is a closed-loop control circuit.

* * * * *